United States Patent
Sohn

(10) Patent No.: US 7,877,615 B2
(45) Date of Patent: Jan. 25, 2011

(54) SEMICONDUCTOR DEVICES AND SCRAMBLED DATA TRANSMISSION METHODS THEREOF

(75) Inventor: Keon-Han Sohn, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 890 days.

(21) Appl. No.: 11/696,403

(22) Filed: Apr. 4, 2007

(65) Prior Publication Data
US 2008/0183978 A1 Jul. 31, 2008

(30) Foreign Application Priority Data
Jan. 29, 2007 (KR) ...................... 10-2007-0009002

(51) Int. Cl.
*G06F 12/14* (2006.01)
(52) U.S. Cl. .................. 713/189; 711/154; 711/164
(58) Field of Classification Search .................. 711/164
See application file for complete search history.

(56) References Cited

U.S. PATENT DOCUMENTS

| | | | |
|---|---|---|---|
| 5,850,452 A | 12/1998 | Sourgen et al. | |
| 6,735,697 B1* | 5/2004 | Buhr | 713/190 |
| 2006/0233360 A1* | 10/2006 | Gammel et al. | 380/37 |
| 2007/0050614 A1* | 3/2007 | Lin et al. | 713/150 |
| 2007/0053515 A1* | 3/2007 | Kim et al. | 380/239 |
| 2007/0121943 A1* | 5/2007 | Dellow et al. | 380/252 |

FOREIGN PATENT DOCUMENTS

| | | |
|---|---|---|
| JP | 2001-060173 A | 3/2001 |
| JP | 2001-109667 | 4/2001 |
| KR | 10-1998-0011494 A | 4/1998 |
| KR | 2004-361986 | 12/2004 |
| KR | 1020060068006 A | 6/2006 |

\* cited by examiner

*Primary Examiner*—Matthew B Smithers
(74) *Attorney, Agent, or Firm*—Myers Bigel Sibley & Sajovec

(57) ABSTRACT

Provided are a semiconductor device and a data transmitting method thereof. The method includes transmitting data into a memory through at least one data line, scrambling the data corresponding to at least one mask data, and determining, using the at least one mask data, data integrity of the data transmitted through the at least one data line. The method may also include storing the data transmitted through the at least one data line in the memory according to a data integrity determination result.

34 Claims, 7 Drawing Sheets

① Data Probing Attact
② Fault Insertion Attact

SEMICONDUCTOR DEVICES AND SCRAMBLED DATA TRANSMISSION METHODS THEREOF

CROSS-REFERENCE TO RELATED APPLICATIONS

This U.S. non-provisional patent application claims priority under 35 U.S.C. §119 of Korean Patent Application No. 2007-09002, filed on Jan. 29, 2007, the entire contents of which are hereby incorporated by reference.

BACKGROUND OF THE INVENTION

The present invention disclosed herein relates to a semiconductor device, and more particularly, to semiconductor device communication and methods thereof.

FIG. 1 is a block diagram illustrating a conventional semiconductor device 10 having a NAND flash memory according to the prior art. Referring to FIG. 1, the semiconductor device 10 includes a controller 12 and a NAND flash memory 14. The controller 12 may input and output data to/from the NAND flash memory 14 through a data line 11. Semiconductor devices 10 having the NAND flash memory 14 may be widely used in smart cards and memory cards.

A conventional memory device 10 may be configured to maintain security based on the stability of a secret key that may use a code algorithm. The controller 12 of the semiconductor device 10 may encrypt data using the code algorithm, store the encrypted data in the NAND flash memory 13, and then read and decode the encrypted data from the NAND flash memory 14.

As illustrated in FIG. 1, although the encrypted data may be transmitted through a data line, the data line may be exposed to a hacker. A hacker may probe the encrypted data that passes through the data line and then read and decrypt the encrypted data by performing a complete enumeration. In some cases, a hacker may perform a fault insertion attack through the data line 11, and thus encrypt the secret key of the semiconductor device 10. Consequently, although the conventional semiconductor device 10 may communicate the encrypted data through a data line, the encrypted data may be vulnerable to a complete enumeration attack and a fault insertion attack.

SUMMARY OF THE INVENTION

Embodiments of the present invention provide semiconductor devices for improving the security of a data line and a data transmission method thereof.

In some embodiments, methods of transmitting data using a semiconductor device may include transmitting data into a memory through at least one data line, scrambling the data corresponding to at least one mask data, and determining, using the at least one mask data, data integrity of the data transmitted through the at least one data line. Such method may include storing the data transmitted through the at least one data line in the memory according to a data integrity determination result.

Some embodiments may also include encrypting data during transmitting data before scrambling the data. Some embodiments may also include determining that the scrambled data does not have integrity according to the data integrity determination result and resetting the memory during the storing of the data.

In some embodiments, storing the data further comprises descrambling the at least one scrambled data.

Some embodiments may include applying power to the semiconductor device and generating the at least one mask data responsive to applying power to the semiconductor device. Embodiments may further include generating a random number corresponding to a code value stored in the memory, wherein, the at least one mask data uses the random number when power is applied to the semiconductor device.

Embodiments of the invention may also include data transmitting methods of a semiconductor device including a transmitter and a receiver. Such methods may include generating at least one scrambled data by using at least one mask data in the transmitter, transmitting the at least one scrambled data from the transmitter to the receiver through at least one data line, and determining scrambled data integrity using the at least one mask data. Such methods may further include receiving the scrambled data transmitted through the at least one data line in the receiver according to a result of determining result.

Some embodiments may also include applying power to the semiconductor device and generating the at least one mask data responsive to applying power to the semiconductor device during generating of the at least one scrambled data. In some embodiments, determining scrambled data integrity includes determining that one of the at least one scrambled data does not have integrity and resetting the receiver responsive to determining that one of the at least one scrambled data does not have integrity.

In some embodiments, receiving the data may include descrambling the at least one scrambled data in the receiver using the at least one mask data.

Some embodiments of the invention may include a semiconductor device. In some embodiments, the semiconductor device may include a memory configured to store data and a controller configured to control the memory, wherein the controller is further configured to scramble the data into at least one scrambled data using at least one mask data, wherein the at least one scrambled data is transmitted into the memory through at least one data line, and wherein the memory is configured to determine, using the at least one mask, data integrity corresponding to the transmitted scrambled data.

In some embodiments, the memory is further configured to descramble the scrambled data using the at least one mask data, and to generate the data from the at least one scrambled data.

In some embodiments, the controller is further configured to generate the at least one mask data when power is applied to the semiconductor device. In some embodiments, the memory is configured to share the at least one mask data with the controller when power is applied to the semiconductor device.

In some embodiments, the controller includes a random number generator configured to generate the at least one mask data.

In some embodiments, the data includes encrypted data.

In some embodiments, the memory is configured to reset responsive to a lack of data integrity in one of the at least one scrambled data. In further embodiments, the controller is configured to reset responsive to a lack of data integrity in one of the at least one scrambled data.

In some embodiments, the memory is configured to scramble the data and then transmit the scrambled data to the controller when the controller reads the data stored in the memory. In some embodiments, the controller includes a data integrity checking circuit configured to determine data integrity of the at least one scrambled data transmitted from the memory. In some embodiments, the at least one scrambled data includes two scrambled data. In some embodiments, the controller includes a scramble circuit configured to use a first mask data and a second mask data to generate a first scrambled data and a second scrambled data from the data. In some embodiments, the scramble circuit includes a first logic circuit configured to receive predetermined bit data and a predetermined bit first mask data, to perform a first XOR operation on the predetermined bit data and the predetermined first mask data, and to output a result of the first XOR operation as the first scrambled data and a second logic circuit configured to receive predetermined bit data and a predetermined bit second mask data, to perform a second XOR operation on the predetermined bit data and the predetermined second mask data, and to output a result of the second XOR operation as the second scrambled data.

In some embodiments, the memory is further configured to receive the first and second scrambled data outputted from the scramble circuit and to use the first mask data to descramble the first scrambled data and the second mask data to descramble the second scrambled data. In some embodiments, the descramble circuit includes a third logic circuit configured to perform an XOR operation on the first scrambled data from the first logic circuit and the first mask data and a fourth logic circuit configured to perform an XOR operation on the second scrambled data from the second logic circuit and the second mask data. In some embodiments, the controller is further configured to generate the first and second mask data when power is applied to the semiconductor device. In some embodiments, the controller further includes a random number generator configured to generate the first and second mask data. In some embodiments, the controller further includes a register configured to store the first and second mask data generated from the random number generator.

In some embodiments, the memory further includes a data integrity checking circuit configured to receive the first and second scrambled data and determine, using the first and second mask data, whether the first and second scrambled data are scrambled. In some embodiments, the data integrity checking circuit includes a fifth logic circuit configured to perform an XOR operation on the first and second scrambled data and a comparison circuit configured to compare an XOR operation value of the first and second mask data with an output value of the fifth logic circuit to generate a reset signal. In some embodiments, memory is reset responsive to the reset signal.

In some embodiments, the controller further includes a key generator configured to generate an initialization key wherein the first mask data and the second mask data are shared by the scramble circuit of the controller and the descramble circuit of the memory, respectively. In some embodiments, the key generator is further configured to generate the initialization key when power is applied to the semiconductor device. In some embodiments, the key generator is configured to generate a predetermined bit initialization key using a hash algorithm when power is applied to the semiconductor device. In some embodiments, the memory includes a NAND flash memory. In some embodiments, the data line utilizes an extra pin of the NAND flash memory.

DETAILED DESCRIPTION OF PREFERRED EMBODIMENTS

Figure 1:
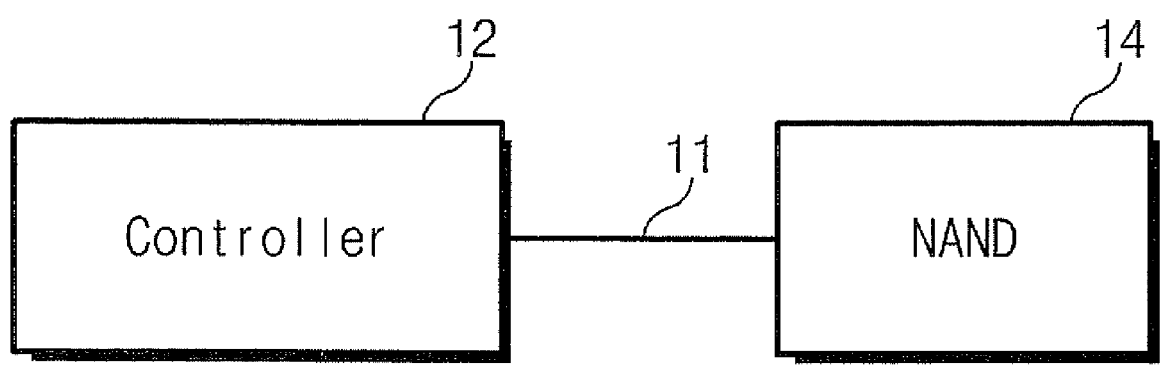
FIG. 1 is a block diagram illustrating a conventional semiconductor device 10 having a NAND flash memory according to the prior art.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

Reference numerals are indicated in detail in some embodiments of the present invention, and their examples are represented in reference drawings. In every possible case, like reference numerals are used for referring to the same or similar elements in the description and drawings.

Figure 2:
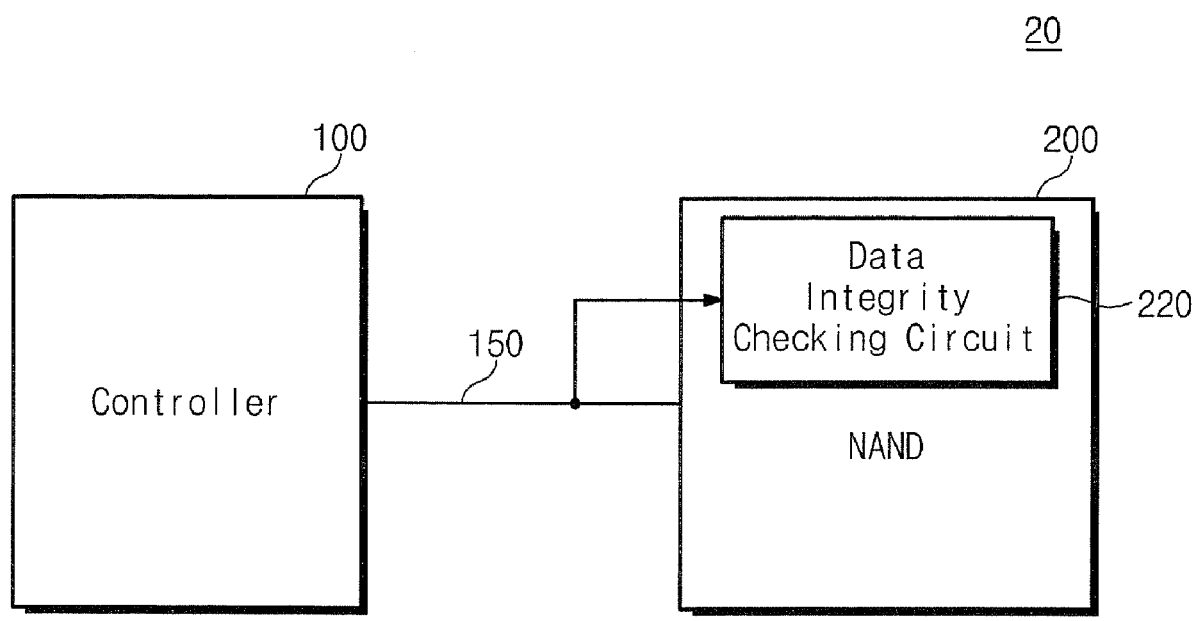
FIG. 2 is a block diagram illustrating a semiconductor device according to some embodiments of the present invention.

Reference is now made to FIG. 2, which is a block diagram illustrating a semiconductor device 20 according to some embodiments of the present invention. A semiconductor device 20 includes a controller 100 and a memory 200. The semiconductor device 20 may transmit scrambled data through a data line 150. Additionally, in the semiconductor device 20, the memory 200 may include a data integrity checking circuit 220 configured to improve the security of the data line 150.

The data integrity checking circuit 220 may determine whether data transmitted through the data line 150 is legal data that is generated from the controller 200. Legal data may be that data that is derived and/or generated using scrambling and/or encrypting schemes as described herein using, for example, keys and/or data masks, among others. The data integrity checking circuit 220 may reset the memory 200 when the data is not legal. Accordingly, the memory device 20 may be protected from a hacker who attacks the data through the data line 150.

The memory 200 herein is described as a NAND flash memory for descriptive convenience, but the invention is not limited to NAND flash memory. The controller 100 and the NAND flash memory 200 are described in more detail with reference to FIGS. 3 and 4.

As illustrated in FIG. 2, the semiconductor device 20 transmits scrambled data through one data line 150. In some embodiments, the controller 100 may generate a plurality of scrambled data for one data, and may transmit the plurality of scrambled data into the NAND flash memory 200 through a plurality of data lines. By way of example, the plurality is described in the context of two scrambled data and data lines, however, the invention is not thus limited and may include more or less than two scrambled data and/or data lines.

Figure 3:
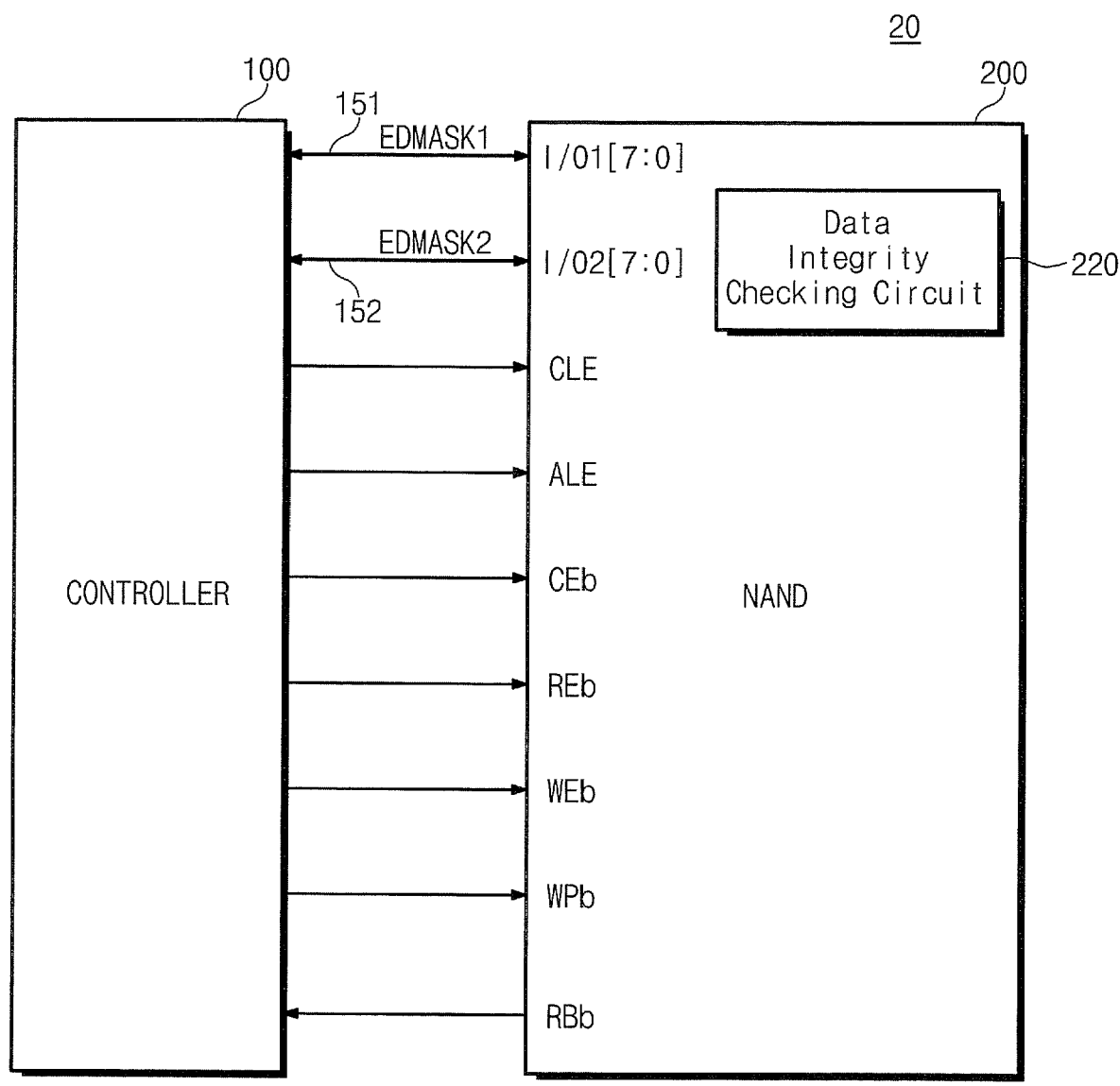
FIG. 3 is a block diagram illustrating a semiconductor device according to some embodiments of the present invention.

Reference is now made to FIG. 3, which is a block diagram illustrating a semiconductor device according to some embodiments of the present invention. The controller 100 and the NAND flash memory 200 may perform data input and output operations through two data transmission lines 151 and 152. The two data transmission lines 151 and 152, respectively, may transmit data EDMASK1 and EDMASK2 that are scrambled using two mask data. The controller 100 and the memory 200 may share the two mask data right after power is applied to the semiconductor memory device 20.

The NAND flash memory 200 may include a data integrity checking circuit 220 configured to receive scrambled data EDMASK1 and EDMASK2 and verify, using the mask data, whether the scrambled data EDMASK1 and EDMASK2 are scrambled. The data integrity checking circuit 220 may ensure the integrity of data transmitted through data lines 151 and 152.

In some embodiments, the data transmitted through data lines 151 and 152 are the scrambled data EDMASK1 and EDMASK2. Data before scrambling may be encrypted by the controller 100. In this manner, the data transmitted through data lines 151 and 152 are scrambled and encrypted data. The data transmitted through data lines 151 and 152 are data that may encrypt the original data twice. Accordingly, although complete enumeration may be performed on the data transmitted through data lines 151 and 152, the original data may be difficult to determine.

Although discussed in the context of a single NAND flash memory 200, the invention is not limited in scope and spirit thereto. For example, some embodiments may include multiple NAND flash memory devices 200. For example, the semiconductor device 20 may have one NAND flash memory, and also may have more than two NAND flash memories. The NAND flash memory 200 may include input/output pins I/01 and I/02, a command latch enable pint CLE, an address latch enable pin ALE, a chip enable pin CEb, a read in enable pine Web, a write protect pin WPb, and an R and B pin RBb.

The input/output pins I/01 and I/02 may receive commands, addresses and data from the controller 220, and output the data during a read operation. Most of input/output pins I/O may be in a floating state when a memory is not selected or there is no output operation. The input/output pins I/01 and I/02 may perform 8-bit data communication through each of the data lines 151 and 152. The NAND flash memory 200 may have one more input/output pin than conventional input/output pins. Since an extra input/output pin may utilize extra pins (not shown) in the NAND flash memory 200, the size of the NAND flash memory may not increase.

The command latch enable pin CLE may receive a command signal from the controller 100. For example, when a signal is logic high, which may be input into the command latch enable pin CLE at a rising edge of a write enable signal, the NAND flash memory 200 recognizes a signal inputted through an input/output bus as a command, and latches corresponding command in a command register (not shown). The address latch pin ALE may receive an address signal from the controller 100. For example, when the address latch signal is at a high logic level at a rising edge of a write enable signal, the NAND flash memory latches an address.

The chip enable pin CEb may receive a signal from the controller 100, which may activate the NAND flash memory 200. The read enable pin REb may receive a signal from the controller 100 for outputting serial data of the NAND flash memory 200. The write enable pin Web may receive a signal from the controller for controlling a write operation in the NAND flash memory 200. For example, the NAND flash memory 200 may latch commands, addresses, and data at a rising edge of the write enable signal. The write protect pin WPb may receive a signal from the controller 100 for preventing an unintentional read or write operation during power change. For example, when the write protect signal is at a low logic level, an internal high voltage generator (not shown) of the NAND flash memory 200 may be reset.

The R and B pin RBb may output a signal into the controller 100 for notifying the state of the NAND flash memory 200. For example, when the NAND flash memory 200 is in a program, erase, or read state, an R and B pin RBb may output logic low into the controller 100.

The semiconductor device 20 may scramble encrypted data by using two shared mask data, and then transmit the encrypted data through each of the data lines 151 and 152. Accordingly, the semiconductor device 20 may enhance the security of data EDMASK1 and EDMASK2 that are transmitted through the data lines 151 and 152.

Moreover, the semiconductor device 20 may include a data integrity checking circuit 220 that may receive scrambled data EDMASK1 and EDMASK2 and verify, using the mask data, whether the scrambled data EDMASK1 and EDMASK2 are scrambled. The data integrity checking circuit 220 may ensure the integrity of data transmitted through data lines 151 and 152.

Figure 4:
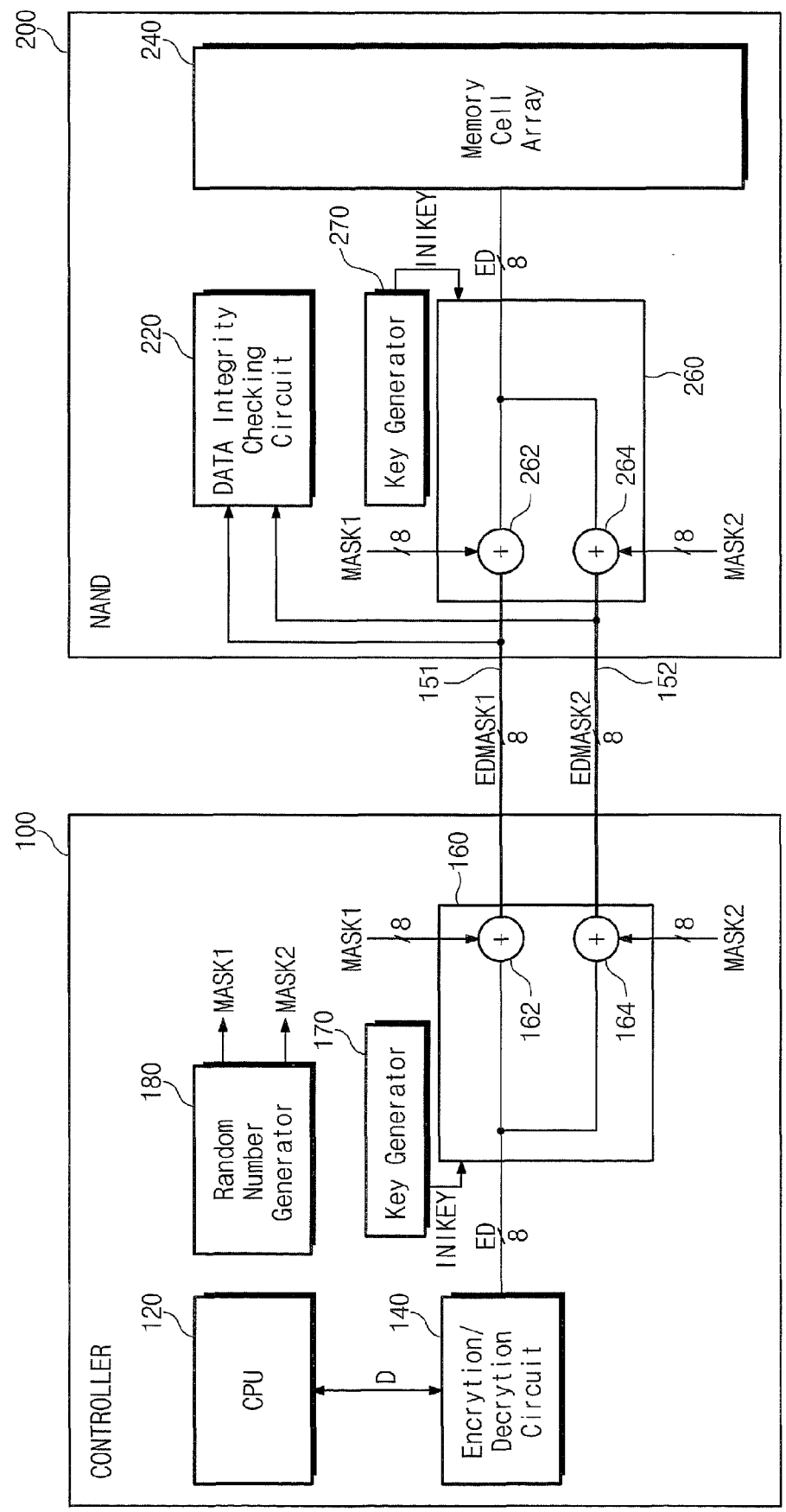
FIG. 4 is a block diagram illustrating a controller and a NAND flash memory according to some embodiments of the present invention.

Reference is now made to FIG. 4, is a block diagram illustrating the controller 100 and the NAND flash memory 200 of FIG. 3 according to some embodiments of the present invention. The controller 100 may include a CPU 120, an encryption/decryption circuit 140, a scramble descramble circuit 160, a key generator 170, and a random number generator 180. The CPU 120 may be configured to control general operations of the controller 100. The decoder circuit 140 may receive data D from the CPU 120 and encrypt the data D in predetermined bits. In some embodiments, the decoder circuit 140 may receive encrypted data ED from the scramble descramble circuit 160 and decode the encrypted data ED into original data. Although, by way of example, the encryption/decryption circuit 140 may encrypt data into 8-bit data, this is merely exemplary and is not intended to limit the invention. For example, the encryption/decryption circuit 140 may encrypt the data into data formats other than 8 bits.

The scramble descramble circuit 160 may include two XOR logic circuits 162 and 164. The scramble descramble circuit 160 may receive the encrypted data ED from the encryption/decryption circuit 140 and combine two mask data MASK1 and MASK2 with the encrypted data ED to generate scrambled data EDMASK1 and EDMASK2.

In some embodiments of a scrambling data process of the scramble descramble circuit 160, a first XOR logic circuit 162 may receive the encrypted data ED from the encryption/decryption circuit 140 and the first mask data MASK1 for performing an XOR operation to generate scrambled data EDMASK1. A second XOR logic circuit 164 may receive the encrypted data ED from the encryption/decryption circuit 140 and the second mask data MASK2 for performing an XOR operation to generate scrambled data EDMASK2. The first and second mask data MASK1 and MASK2 may be generated from a random number generator 180. The first and second mask data MASK1 and MASK2 may be stored in a register (not shown) for descrambling. The first and second mask data MASK1 and MASK2 may be 8-bit data, respectively.

In some embodiments, the scramble descramble circuit 160 may receive the scrambled data EDMASK1 and EDMASK2 from the NAND flash memory 200, combine them with the two mask data MASK1 and MASK2, respectively, for descrambling, and then generate encrypted data ED.

In some embodiments of a descrambling data process of the scramble descramble circuit 160, a first XOR logic circuit 162 may receive the descrambled data EDMASK1 from the NAND flash memory 200 and the first mask data MASK1 for performing an XOR operation to generate encrypted data ED. A second XOR logic circuit 164 may receive the descrambled data EDMASK2 from the NAND flash memory 200 and the second mask data MASK2 for performing an XOR operation to generate encrypted data ED. The first and second mask data MASK1 and MASK2 may be stored in a register (not shown).

The key generator 170 may generate an 8-bit initialization key INIKEY for delivering the first and second mask data MASK1 and MASK2 that are generated by the random generator 180 into the NAND flash memory 200.

The random number generator 180 may generate 8-bit first and second mask data MASK1 and MASK2 for scrambling the encrypted data ED. The random number generator 180 may generate arbitrary first and second mask data MASK1 and MASK2 each time power is applied to the semiconductor device 20. The generated mask data MASK1 and MASK2 may be stored in an internal register (not shown) for descrambling.

The NAND flash memory 200 may include the data integrity checking circuit 220, the memory cell array 240, the descramble scramble circuit 260, and the key generator 270. The NAND flash memory 200 may receive the mask data MASK 1 and MASK2 from the controller 100 and store them in the register (not shown) as soon as power is applied to the semiconductor device 10.

The data integrity checking circuit 220 may receive the data EDMASK1 and EDMASK2 through the data lines 151 and 152, and then verify whether the data EDMASK1 and EDMASK2 are scrambled by using the mask data MASK1 and MASK2. In this manner, the data integrity checking circuit is configured to determine data integrity. When the data EDMASK1 and EDMASK2 are illegally scrambled, the data integrity checking circuit 220 may generate a reset signal RST to erase all data of a memory cell array 240.

The descramble scramble circuit 260 may include two XOR logic circuits 262 and 264. The descramble scramble circuit 260 may receive the two data EDMASK1 and EDMASK2 through the data lines 151 and 152, respectively, combine them with the two mask data MASK1 and MASK2, respectively, and then generate the descrambled encrypted data ED.

In some embodiments of a descrambling data process of the data integrity checking circuit 220, a third XOR logic circuit 262 may receive the scrambled data EDMASK1 from the controller 110 and the first mask data MASK1 for an XOR operation, and then generate the descrambled data ED. A fourth XOR logic circuit 264 may receive the scrambled data EDMASK2 from the controller 110 and the second mask data MASK2 for an XOR operation, and then generate the descrambled data ED. The first and second mask data MASK1 and MASK2 may be shared values that are generated in the controller when power applied to the semiconductor device 10.

In some embodiments, the descramble scramble circuit 260 may receive the encrypted data from the memory cell array 240 of the NAND flash memory 200, and then combine them with the two mask data MASK1 and MASK2 for scrambling, respectively, to generate scrambled data EDMASK1 and EDMASK2.

In some embodiments of a scrambling process of the descramble scramble circuit 260, the third XOR logic circuit 262 may receive the encrypted data ED from the memory cell array 240 and the first mask data MASK1 for an XOR operation, and then generate the scrambled data EDMASK1. The fourth XOR logic circuit 264 may receive the encrypted data ED from the memory cell array 240 and the second mask data MASK2 for an XOR operation, and then generate the scrambled data EDMASK2. The first and second masks MASK1 and MASK2 may be stored values in a register (not shown).

Figure 5:
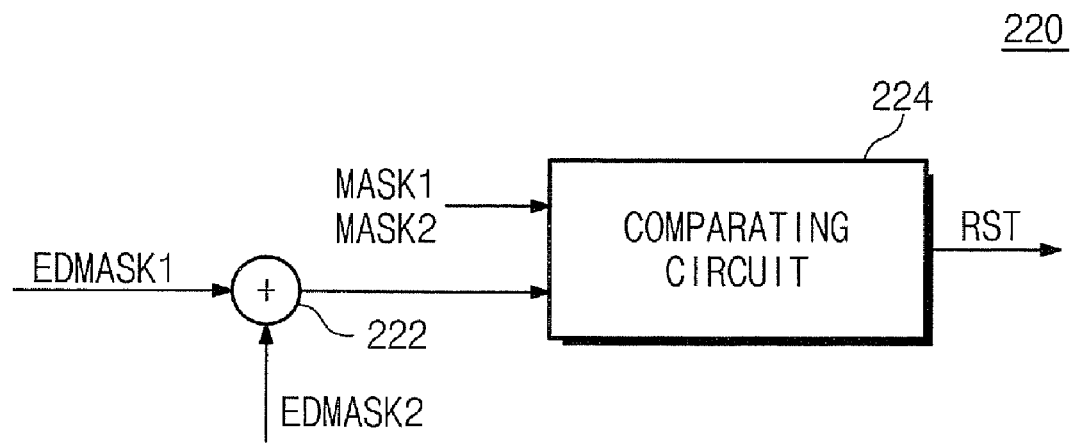
FIG. 5 is a block diagram illustrating a data integrity checking circuit according to some embodiments of the present invention.

Reference is now made to FIG. 5, which is block diagram illustrating a data integrity checking circuit 220 according to some embodiments of the present invention. The data integrity checking circuit 220 may include an XOR logic circuit 222 and a comparing circuit 224.

In some embodiments of a process of checking integrity in the data integrity checking circuit 220 the XOR logic circuit 222 may receive the data EDMASK1 from the first data line 151 and the data EDMASK2 from the second data line 152 for an XOR operation. By virtue of the XOR logic, the logic value of the XOR logic circuit 222 satisfies the following equation:

$$EDMASK1 \oplus EDMASK2 = (ED \oplus MASK1) \oplus (ED \oplus MASK2) = MASK1 \oplus MASK2.$$

The comparing circuit 224 may read the mask data MASK1 and MASK2 from the register, and then compare a value of the XOR operation with an output value of the XOR logic circuit 222. If the value of the XOR operation and the output value of the XOR logic circuit 222 are the same, the comparing circuit 224 may determine that the data EDMASK1 and EDMASK2 are legally scrambled data. Alternatively, if the value of the XOR operation and the output value of the XOR logic circuit 222 are not the same, the comparing circuit 224 may determine that the data EDMASK1 and EDMASK2 transmitted through the transmission lines 151 and 152 are illegally scrambled data, and then generate a high-level reset signal RST. In response to the reset signal RST from the comparing circuit 224, the data of the memory cell array 240 in the NAND flash memory 200 may be simultaneously erased.

The data integrity checking circuit 220, as illustrated in FIG. 3, may be included in the NAND flash memory 200. In some embodiments, the data integrity checking circuit 220 may be included in the controller 100. The controller 100 may be reset in response to the data integrity checking circuit 220 and thus, the controller 100 may be safe from illegal attack.

The key generators 170 and 270, as illustrated in FIG. 4, may be included in the controller 100 and the NAND flash memory 200, respectively. The key generators 170 and 270 may have the same structure.

Figure 6:
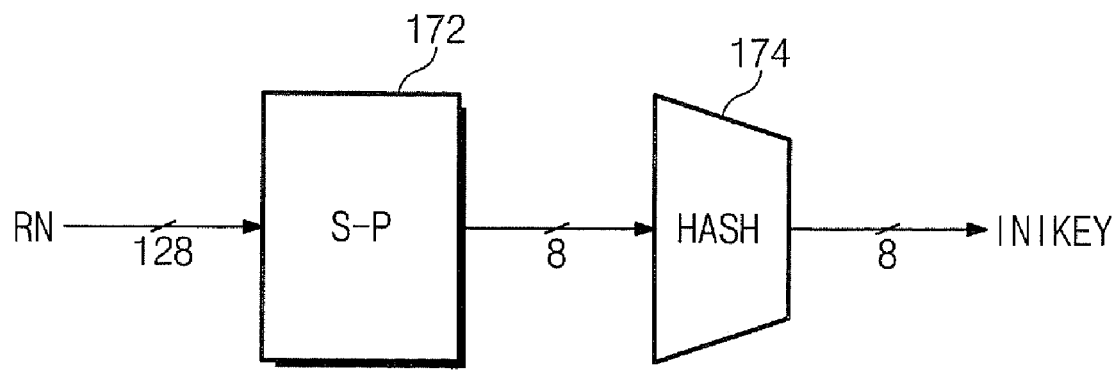
FIG. 6 is a block diagram illustrating a key generator according to some embodiments of the present invention.

Reference is now made to FIG. 6, which is block diagram illustrating the key generator 170 according to some embodiments of the present invention. The key generator 170 may include a substitution and permutation circuit 172 and a hash circuit 174. The key generator 170 may generate an initialization key INIKEY for sharing the mask data MASK1 and MASK2 with the controller 100 and the NAND flash memory 200.

The substitution and permutation circuit 172 may receive a 32-bit random number RN and generate new encrypted 32-bit data by repeating permutation and substitution. The random number RN may be transmitted from unique (ID UID) of the NAND flash memory 200. The UID may be a value of one time programmable (OPT) region in the NAND flash memory as listed in the following exemplary table.

| Column | | Contents |
| --- | --- | --- |
| $1^{st}$ | | Maker Code |
| $2^{th}$ | | Maker code |
| $3^{th}$–$6^{th}$ | Byte | Random number generated by samsung |
| $7^{th}$ | Byte | Second1 |
| $8^{th}$ | Byte | Second2 |
| $9^{th}$ | Byte | Minute1 |
| $10^{th}$ | Byte | Minute2 |
| $11^{th}$ | Byte | Hour1 |
| $12^{th}$ | Byte | Hour2 |
| $13^{th}$ | Byte | Random number generated by samsung |
| $14^{th}$ | Byte | Day |
| $15^{th}$ | Byte | Month |
| $16^{th}$ | Byte | Year |

The random number RN may use random numbers generated in $3^{th}$ to $6^{th}$ or $13^{th}$ of the above table. The hash circuit 174 may receive the 32-bit data from the substitution and permutation circuit 172, and generate an 8-bit initialization key INIKEY through a hash algorithm.

Figure 7:
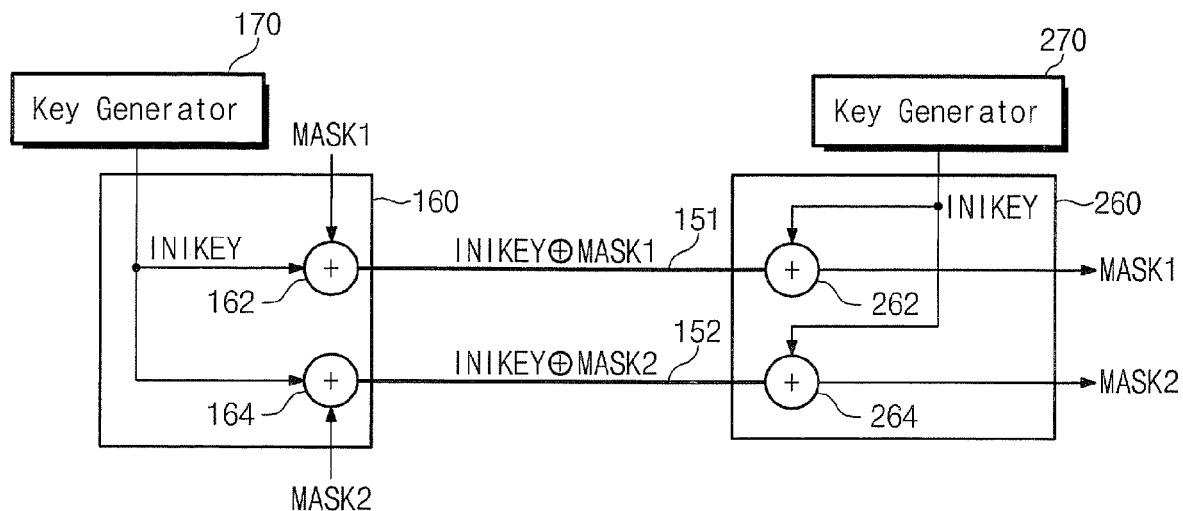
FIG. 7 is a block diagram illustrating methods of sharing a first mask data MASK1 and a second mask data MASK2 according to some embodiments of the present invention.

Reference is made to FIG. 7, which a block diagram illustrating a method of sharing a first mask data MASK1 and a second mask data MASK2 according to some embodiments of the present invention. In some embodiments of a process of sharing the first and second mask data MASK1 and MASK2, when power is applied to the semiconductor device 20, the random number generator 180 may generate the two mask data MASK1 and MASK2. The generated mask data MASK1 and MASK2 may be stored in an internal register (not shown). In some embodiments, the key generators 170 and 270 may generate the initialization key INIKEY simultaneously when power is applied to the semiconductor device 10. That is, the key generator 170 may read a random number value from the UID region of the NAND flash memory 260, and then generate the initialization key INIKEY. The key generator 270 may read a random number value from the UID region, and then generate the initialization key INIKEY.

A scramble descramble circuit 160 may scramble the initialization key INIKEY by using the first and second mask data MASK1 and MASK2. The first XOR logic circuit 162 performs an XOR operation on the initialization key INIKEY and the first mask data MASK1, and then delivers the calculated data (INIKEY*MASK1) into the third XOR logic circuit 262 through the data line 151. The second XOR logic circuit 164 performs an XOR operation on the initialization key INIKEY and the second mask data MASK2, and then delivers the calculated data (INIKEY*MASK2) into the fourth XOR logic circuit 264 through the data line 152.

A scramble descramble circuit 260 may descramble data (INIKEY*MASK1 and INIKEY*MASK2), which may be transmitted through the data lines 151 and 152, respectively, using the initial key INIKEY. The descrambled data may be the first and second mask data MASK1 and MASK2, respectively.

In some embodiments of a process of generating the first and second mask data MASK1 and MASK2 that may be stored in the NAND flash memory 200, the third XOR logic circuit 262 performs an XOR operation on the initialization key INIKEY and the data (INIKEY*MASK1) from the second XOR logic circuit 164. By virtue of the XOR operation, an output value of the third XOR logic circuit 262 may become the first mask data MASK1. The fourth XOR logic circuit 264 performs an XOR operation on the initialization key INIKEY and the data (INIKEY*MASK1) from the second XOR logic circuit 164. By virtue of the XOR operation, an output value of the fourth XOR logic circuit 264 may become the second mask data MASK2. The first and second mask data MASK1 and MASK2 from the descrambler scramble circuit 260 may be stored in a register of the NAND flash memory 200.

The controller 100 and the NAND flash memory 200 in the semiconductor device 20 may scramble the encrypted data by using the two mask data MASK1 and MASK2 and communicate through the respectively different data lines 151 and 152. Accordingly, although a hacker may perform a complete enumeration on data passing through the data lines between the controller 100 and the NAND flash memory 200, the original data may be difficult to determine. Further, since the semiconductor device 20 may verify data integrity by using the already shared mask data MASK1 and MASK2, illegal data input can be prevented. In some embodiments, the semiconductor device 20 may be applied to a memory card.

Although, as illustrated, the semiconductor device 20 transmits the scrambled data through the two data lines 151 and 152, embodiments including more than three data lines can be used for data transmission using the devices and methods herein. Further, as the number of the data lines increases, the degree of data integrity may be improved.

In some embodiments of a semiconductor device 20, the data integrity checking circuit 220 may be included in the NAND flash memory 200. In some embodiments, the data integrity checking circuit 220 may be placed outside the NAND flash memory 200.

Figure 8:
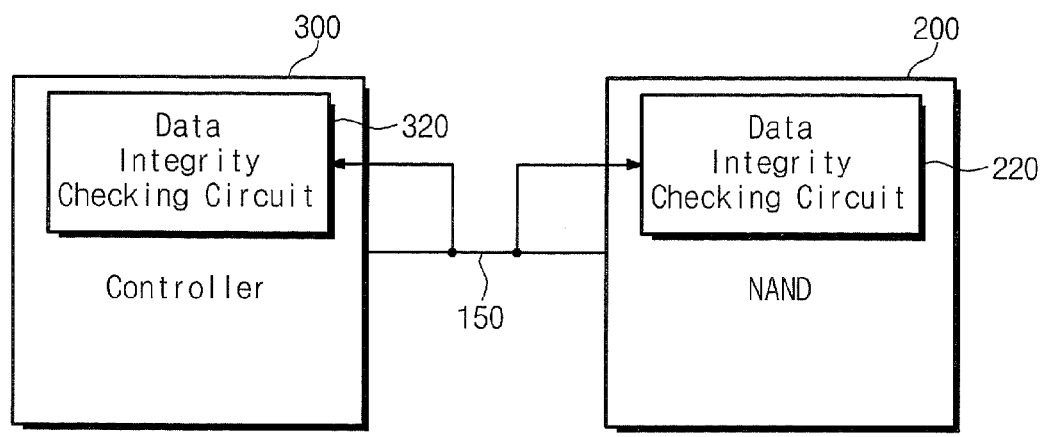
FIG. 8 is a block diagram illustrating a semiconductor device according to some embodiments of the present invention.

Reference is now made to FIG. 8, which is a block diagram illustrating a semiconductor device 30 according to some embodiments of the present invention. A controller 300 of the semiconductor device 30 may include a data integrity checking circuit 320. Embodiments of the NAND flash memory 200 are discussed above regarding FIG. 2.

When the NAND flash memory 200 read the encrypted data, the data transmitted through the data line 150 may be data that is scrambled in the NAND flash memory 200. At this point, the controller 300 may include a data integrity checking circuit 320 configured to receive scrambled data transmitted through the data line 150 and verify that the scrambled data is legal. Legally scrambled data is that data which is consistent with the scrambling scheme and/or encryption scheme and may also be termed legal in contrast with data that might be introduced by a potential hacker. If the scrambled data transmitted through the data line 150 is illegal, the data integrity checking circuit 320 may generate a reset signal that resets the controller 300.

Figure 9:
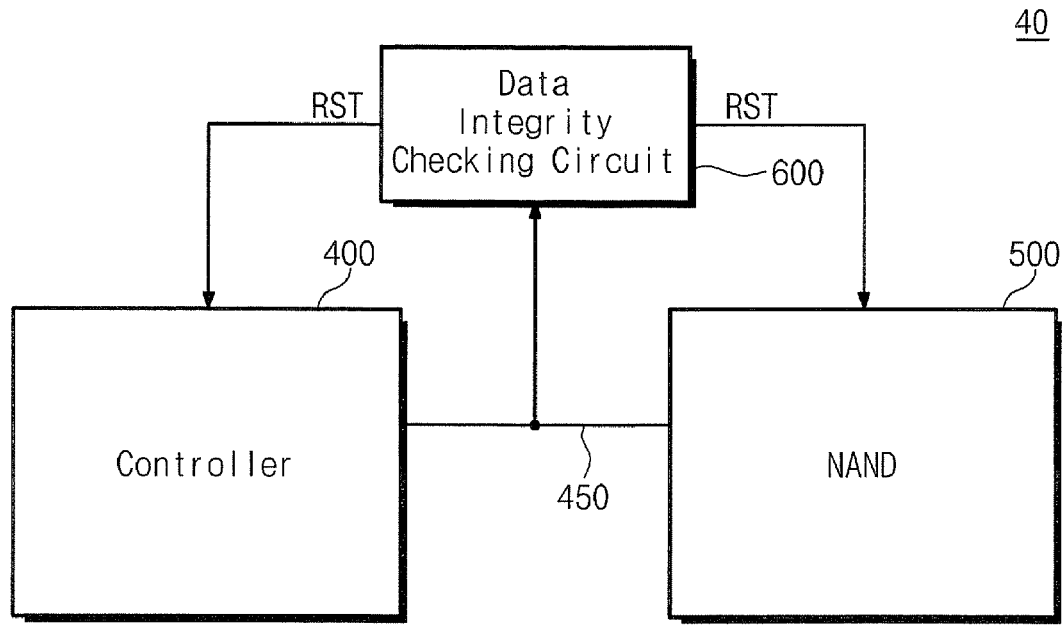
FIG. 9 is a block diagram illustrating a semiconductor device according to some other embodiments of the present invention.

In some embodiments, the data integrity checking circuit of the present invention may not be included in the controller and the memory. Reference is now made to FIG. 9, which is a block diagram illustrating a semiconductor device 40 according to a third embodiment of the present invention. The semiconductor device 40 may include a controller 400, a NAND flash memory 500, and a data integrity checker 600. The data integrity checker 600 may detect data transmitted through a data line 450, and then determine whether the data is legal. The legal data may be data transmitted through the data line 450 and scrambled using the shared mask data. The data integrity checker 600 may include information for the mask data that is used for scrambling the data from the controller 400 and the NAND flash memory 500. If the data transmitted through the data line 450 is illegal, the data integrity checker 600 may generate a reset signal RST to reset the controller 400 and the memory 500. In some embodiments, the semiconductor device 40 may include a single chip. In addition to a semiconductor device for transmitting data into a memory and a controller that controls the memory, in some embodiments, the semiconductor device may be used to transmit data into conventional transmitter and receiver.

Figure 10:
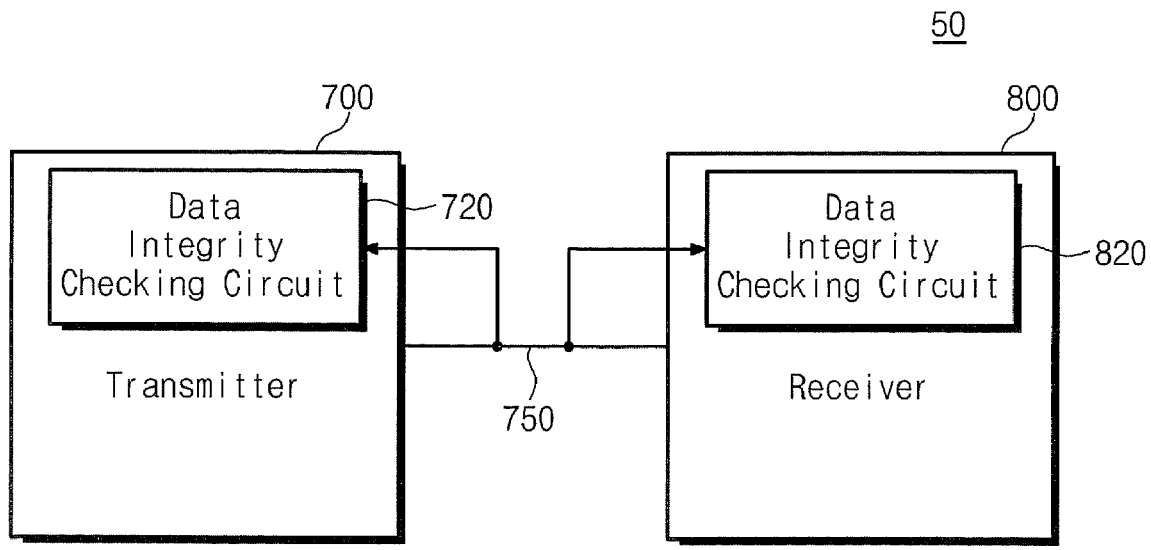
FIG. 10 is a block diagram illustrating a semiconductor device according to further embodiments of the present invention.

Reference is now made to FIG. 10, which is a block diagram illustrating a semiconductor device 50 according to other embodiments of the present invention. The semiconductor device 50 may include data integrity checking circuits 720 and 820 that may determine data integrity of data transmitted through a transmission line 750.

Although illustrated in the context of a single data line, the semiconductor device 50 may include more than one data line within the spirit and scope of the invention described herein. For example, the semiconductor device 50 may perform scrambling and descrambling operations through two data lines. As more data lines are added, the data transmitted through the data line may increase in data security.

The semiconductor device may include the data integrity checking circuit that may verify whether the data transmitted through the data line is legal or not, and then determine whether to perform reset or not responsive to the result. Thus, the semiconductor device of the present invention can enhance the security of the data line. Since the semiconductor device transmits the scrambled data through the data line, the possibility of being hacked may be decreased. The semiconductor devices and the data transmission methods thereof according to embodiments of the present invention may enhance the data security by scrambling the encrypted data by using the mask data, respectively.

In some embodiments, the semiconductor device and the data transmission method thereof according to the present invention may verify whether the scrambled data are scrambled using the shared mask data or not, thereby determining the data integrity.

Although the present invention has been described in terms of specific embodiments, the present invention is not intended to be limited by the embodiments described herein. Thus, the scope may be determined by the following claims.

What is claimed is:

1. A method of transmitting data using a semiconductor device, the method comprising:
   transmitting data into a memory through at least one data line;
   scrambling the data corresponding to at least one mask data;
   determining, using the at least one mask data, data integrity of the scrambled data transmitted through the at least one data line;
   storing the scrambled data transmitted through the at least one data line in the memory if the scrambled data has integrity according to a data integrity determination result; and
   resetting the memory during storing the scrambled data if the scrambled data does not have integrity according to the data integrity determination result.

2. The method of claim 1, further comprising encrypting data during transmitting data before scrambling the data.

3. The method of claim 1, wherein storing the data further comprises descrambling the at least one scrambled data.

4. The method of claim 1, further comprising:
   applying power to the semiconductor device; and
   generating the at least one mask data responsive to applying power to the semiconductor device.

5. The method of claim 4, further comprising:
   generating a random number corresponding to a code value stored in the memory,
   wherein, the at least one mask data uses the random number when power is applied to the semiconductor device.

6. A data transmitting method of a semiconductor device including a transmitter and a receiver, the method comprising:
   generating at least one scrambled data by using at least one mask data in the transmitter;
   transmitting the at least one scrambled data from the transmitter to the receiver through at least one data line;
   determining scrambled data integrity using the at least one mask data; and
   receiving the scrambled data transmitted through the at least one data line in the receiver according to a result of determining result;
   applying power to the semiconductor device; and
   generating the at least one mask data responsive to applying power to the semiconductor device during generating of the at least one scrambled data.

7. The method of claim 6, wherein determining scrambled data integrity comprises:
   determining that one of the at least one scrambled data does not have integrity; and resetting the receiver responsive to determining that one of the at least one scrambled data does not have integrity.

8. The method of claim 6, wherein receiving the data further comprises descrambling the at least one scrambled data in the receiver using the at least one mask data.

9. A semiconductor device comprises:
a memory configured to store data; and
a controller configured to control the memory,
wherein the controller is further configured to scramble the data into at least one scrambled data using at least one mask data, wherein the at least one scrambled data is transmitted into the memory through at least one data line, and wherein the memory is configured to determine, using the at least one mask, data integrity corresponding to the transmitted scrambled data.

10. The semiconductor device of claim 9, wherein the memory is further configured to descramble the scrambled data using the at least one mask data, and to generate the data from the at least one scrambled data.

11. The semiconductor device of claim 10, wherein, the memory is configured to scramble the data and then transmit the scrambled data to the controller when the controller reads the data stored in the memory.

12. The semiconductor device of claim 11, wherein the controller further comprises a data integrity checking circuit configured to determine data integrity of the at least one scrambled data transmitted from the memory.

13. The semiconductor device of claim 12, wherein the at least one scrambled data comprises two scrambled data.

14. The semiconductor device of claim 13, wherein the controller comprises a scramble circuit configured to use a first mask data and a second mask data to generate a first scrambled data and a second scrambled data from the data.

15. The semiconductor device of claim 14, wherein the scramble circuit further comprises:
a first logic circuit configured to receive predetermined bit data and a predetermined bit first mask data, to perform a first XOR operation on the predetermined bit data and the predetermined first mask data, and to output a result of the first XOR operation as the first scrambled data; and
a second logic circuit configured to receive predetermined bit data and a predetermined bit second mask data, to perform a second XOR operation on the predetermined bit data and the predetermined second mask data, and to output a result of the second XOR operation as the second scrambled data.

16. The semiconductor device of claim 15, wherein the memory is further configured to receive the first and second scrambled data outputted from the scramble circuit and to use the first mask data to descramble the first scrambled data and the second mask data to descramble the second scrambled data.

17. The semiconductor device of claim 16, wherein the descramble circuit comprises:
a third logic circuit configured to perform an XOR operation on the first scrambled data from the first logic circuit and the first mask data; and
a fourth logic circuit configured to perform an XOR operation on the second scrambled data from the second logic circuit and the second mask data.

18. The semiconductor device of claim 17, wherein the controller is further configured to generate the first and second mask data when power is applied to the semiconductor device.

19. The semiconductor device of claim 18, wherein the controller further comprises a random number generator configured to generate the first and second mask data.

20. The semiconductor device of claim 19, wherein the controller further comprises a register configured to store the first and second mask data generated from the random number generator.

21. The semiconductor device of claim 16, wherein the memory further comprises a data integrity checking circuit configured to receive the first and second scrambled data and determine, using the first and second mask data, whether the first and second scrambled data are scrambled.

22. The semiconductor device of claim 21, wherein the data integrity checking circuit comprises:
a fifth logic circuit configured to perform an XOR operation on the first and second scrambled data; and
a comparison circuit configured to compare an XOR operation value of the first and second mask data with an output value of the fifth logic circuit to generate a reset signal.

23. The semiconductor device of claim 22, wherein memory is reset responsive to the reset signal.

24. The semiconductor device of claim 23, wherein the controller further comprises a key generator configured to generate an initialization key wherein the first mask data and the second mask data are shared by the scramble circuit of the controller and the descramble circuit of the memory, respectively.

25. The semiconductor device of claim 24, wherein the key generator is further configured to generate the initialization key when power is applied to the semiconductor device.

26. The semiconductor device of claim 25, wherein the key generator is configured to generate a predetermined bit initialization key using a hash algorithm when power is applied to the semiconductor device.

27. The semiconductor device of claim 22, wherein the memory comprises a NAND flash memory.

28. The semiconductor device of claim 27, wherein the data line utilizes an extra pin of the NAND flash memory.

29. The semiconductor device of claim 9, wherein controller is further configured to generate the at least one mask data when power is applied to the semiconductor device.

30. The semiconductor device of claim 29, wherein the memory is configured to share the at least one mask data with the controller when power is applied to the semiconductor device.

31. The semiconductor device of claim 9, wherein the controller further comprises a random number generator configured to generate the at least one mask data.

32. The semiconductor device of claim 9, wherein the data comprises encrypted data.

33. The semiconductor device of claim 9, wherein the memory is configured to reset responsive to a lack of data integrity in one of the at least one scrambled data.

34. The semiconductor device of claim 33, wherein the controller is configured to reset responsive to a lack of data integrity in one of the at least one scrambled data.

* * * * *